United States Patent [19]

Hicks, Jr.

[11] 4,372,769
[45] Feb. 8, 1983

[54] MULTI-FIBER FIBER-OPTIC ASSEMBLY METHOD

[76] Inventor: John W. Hicks, Jr., P.O. Box 345, Southbridge, Mass. 01550

[21] Appl. No.: 285,198

[22] Filed: Jul. 20, 1981

[51] Int. Cl.$^3$ ............................................. C03B 37/14
[52] U.S. Cl. ..................................... 65/4.21; 264/1.5; 264/1.7
[58] Field of Search .................. 65/4.1, 4.2, 4.21, 4.4, 65/12, 156, 162, 319, 362; 264/1.5, 1.7; 425/144, 416, 521; 156/296

[56] References Cited

U.S. PATENT DOCUMENTS

| | | | |
|---|---|---|---|
| 3,626,040 | 12/1971 | Nagao et al. | 65/4.21 X |
| 3,669,639 | 6/1972 | Inoue et al. | 65/4.21 |
| 3,859,071 | 1/1975 | Beasley et al. | 65/4.21 X |
| 3,961,931 | 6/1976 | Nakagawa et al. | 65/156 |
| 4,002,452 | 1/1977 | Hopkins | 65/319 X |

FOREIGN PATENT DOCUMENTS 975391  11/1964  United Kingdom ................ 65/4.21

*Primary Examiner*—Richard V. Fisher
*Attorney, Agent, or Firm*—Wolder, Gross & Yavner

[57] ABSTRACT

A method and apparatus for assembling fiber optic devices in multi-fiber layers to avoid the problems of misalignment and interstices. The furnace apparatus includes a mold for receiving the fiber devices and a packing piston for placing each layer of fiber devices in position. Heating is maintained in the furnace at a level so that heat penetrates from the fibers already packed into the new layer sufficiently to enable the new layer to adhere, but no more, so that the piston may be withdrawn before it adheres to the new layer.

2 Claims, 8 Drawing Figures

MULTI-FIBER FIBER-OPTIC ASSEMBLY METHOD

This invention relates primarily to a method and apparatus for fusing fiber optics material and more particularly to such methods and apparatus for stacking multi-fibers and multi-multi-fibers in aligned layers with a minimum of interstices.

It is commonly desired to fuse fiber optic material in order to, for example, provide end windows for cathode ray tubes. Typically, a clad cane of fiber optics material is drawn down to a reduced diameter and assembled with a number of other drawn canes to produce a multi-fiber. Likewise, frequently, a number of such multi-fibers are assembled with other multi-fibers and drawn down to produce a multi-multi-fiber. (Both multi-fibers and multi-multi-fibers will be referred to herein as multi-fibers.)

The cross-sectional shape of multi-fibers is frequently hexagonal, which enables a close packing between such multi-fibers. Furthermore, hexagonal fibers are self-aligning, so that along the length of a multi-fiber array, two layers of the multi-fibers will maintain their relative positions with respect to each other.

Furthermore, other shapes are self-aligning, such as a solid cross or a triangular shape.

With respect to simple squares or rectangles, however, a closed pack with minimal interstices is formed, but alignment is difficult. For instance, with squares or rectangles for the shape of multi-fibers, an array with one line of multi-fibers on top of the other will probably result in shearing one layer with respect to the other layer.

Accordingly, it is a primary object of the present invention to provide a method and apparatus to produce a well-aligned stack of multi-fibers using square, rectangular or other shapes common for multi-fibers.

It is a further object of the present invention to provide means for assembling a single layer of multi-fibers and for transferring that layer to a stack of layers in order to provide an assembly which is well aligned and without a significant amount of interstices.

These and other objects of the present invention are provided by means of a method which features providing a packing piston surface, assembling a single layer of multi-fibers upon such surface, transferring the layer from the piston surface to an oven mold, heating the oven to the point where the layer will adhere to previously formed layers in the mold and withdrawing the piston surface before the assembled layer adheres to such surface. The apparatus of the present invention features an oven comprising a mold with a substantially rectangular opening, a piston movable into and out of said opening and means for controlling the heat of the oven in terms of timing and temperature such that adherence is obtained between a transfer layer and an existing layer prior to adherence between the transfer layer and the piston surface.

Other objects, features and advantages of the present invention will become apparent by reference to the following, more detailed description of a preferred, but nontheless illustrative, embodiment of the present invention, with reference to the accompanying drawings, wherein.

Figure 1:
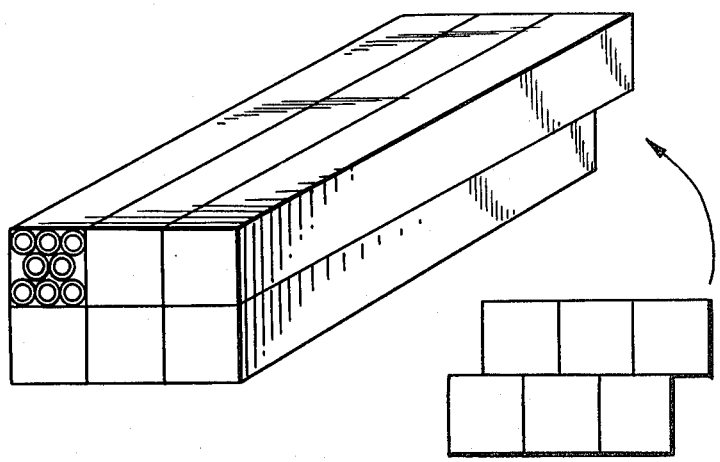
FIG. 1 is a schematic representation of two layers of multi-fibers of substantially square cross-section, showing particularly the shearing likely with prior art methods and apparatus.

FIG. 1 represents the prior art, wherein a stack of substantially square multi-fibers is assembled one layer upon the other. FIG. 1 also represents the shearing problem which pertains to such prior art assemblies and which causes innumerable problems with respect to the use of such arrays in cathode ray tube windows, as an example. In other words, without the apparatus and method of the present invention, it is likely that a first layer of multi-fibers will be displaced laterally at points along the length of such fibers with respect to a second layer. Thus, relative misalignment between layers of multi-fibers will result, defeating the purpose for which such multi-fibers are assembled.

Figure 2:
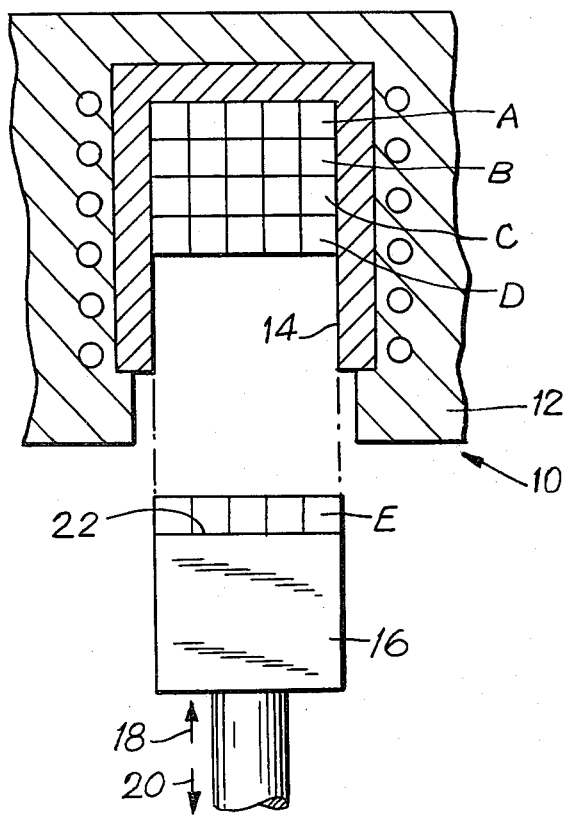
FIG. 2 is a representation of apparatus according to the present invention showing particularly a furnace, including a mold defining a substantially rectangular opening, into which layers of multi-fibers are inserted; the apparatus further including a piston movable into and out of the opening with a transfer layer of multi-fibers.

According to the present invention (FIG. 2), a furnace generally designated 10 is provided to include a mold 12 defining a substantially rectangular opening 14 into which layers A, B, C and D are formed. A piston 16 is intended for vertical motion in directions 18, 20, into and out of opening 14.

Piston 16 defines a packing surface 22, upon which is formed a transfer layer E of multi-fibers. The furnace is controlled, by means well known in the art, in terms of timing and temperature, so as to provide operation whereby the temperature within opening 14 is sufficient to cause an adherence between transfer layer E and layer D upon contact enabled by motion in direction 18 of piston 16. Thus, when transfer layer E contacts layer D, the tacking temperature will adhere the two layers by penetration of heat to the transfer layer. Control is also provided by means well known in the art so that transfer layer E contacts layer D lightly at first and then with increasing pressure. Heat then penetrates the transfer layer, and before the transfer layer E becomes hot enough to adhere to piston surface 22, the piston is retracted in direction 20.

Alignment tolerances are controlled simply by an initial careful alignment of piston 16 and opening 14. Thus, significant alignment tolerance requirements upon preparation of transfer layers is eliminated.

Figure 3:
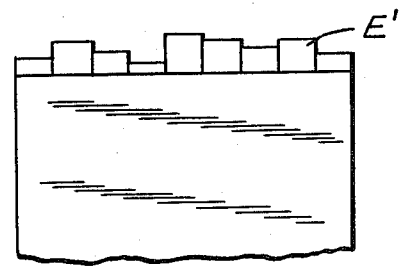
FIG. 3 is a representation of a piston with an irregular layer of multi-fibers thereon, showing particularly the versatility of the present invention with respect to practical multi-fiber shapes.

FIG. 3 represents a grossly exaggerated uneven alignment at the top surface of transfer layer E'. A series of such layers would normally produce significant misalignment in the assembly after only a few such layers are placed upon the assembly. In the present invention, since the assembly is hot, the uneven top surface of transfer layer E' is "imprinted" on and absorbed by the existing assembly, so that the exposed lower face of the last layer to be inserted is always flat and even. This prevents cumulative misalignment build-up.

Figure 4:
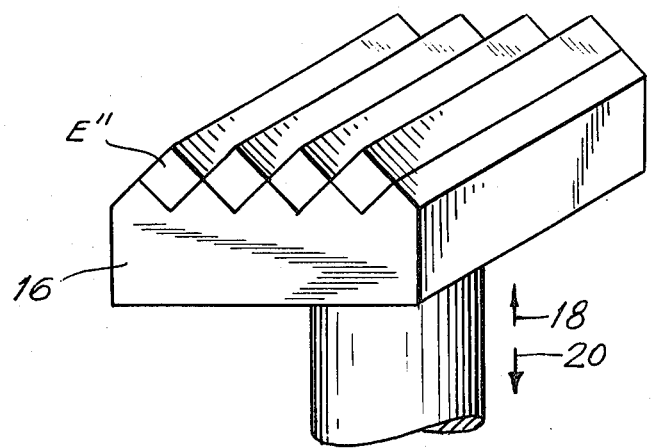
FIG. 4 is a view similar to that of FIG. 3, but showing particularly a piston having an upper surface shape to accommodate square multi-fibers in a diagonal orientation.

On the other hand, assuming that the transfer layer is perfect and of equal size, piston 16 is formed, according to an alternative embodiment of the present invention, as shown in FIG. 4, whereby transfer layer E" is mounted on the piston 16 in a diagonal orientation.

Figure 5A:
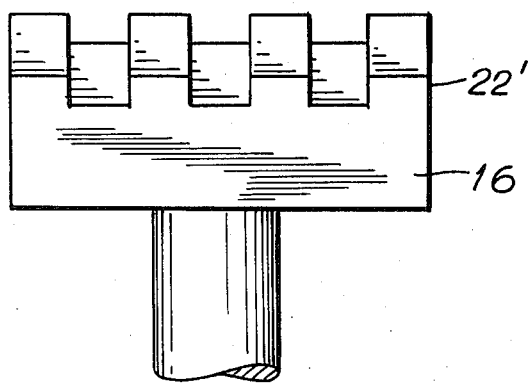
FIGS. 5A and 5B represent alternative embodiments indicating the apparatus as including a piston upper surface used to intentionally step the transfer layer of multi-fibers.
Figure 5B:
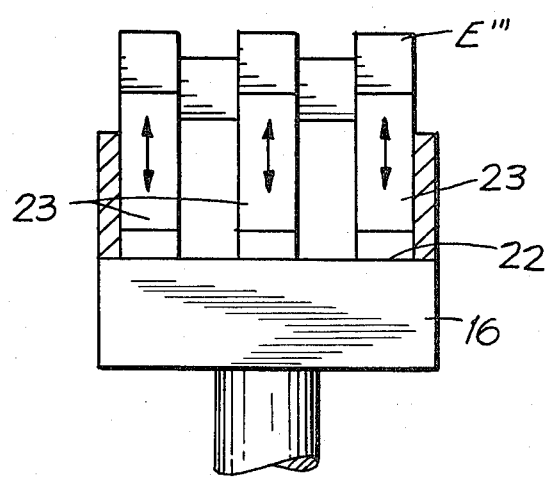

Further alternative embodiments are represented in FIGS. 5A and 5B, whereby FIG. 5A represents a piston 16 with a stepped packing surface 22'. FIG. 5B, on the other hand, uses stepped movable steel bars 23 to accommodate the step transfer layer E''' of multi-fibers. In either event, the step in the layer of multi-fibers is eliminated upon tacking to the existing assembly in opening 14 of furnace 10. The FIG. 5B steps are eliminated by movable functioning of steel bars 23. Also, in either case, the invention is adapted to hexagon and to other multi-fiber shapes.

Figure 6:
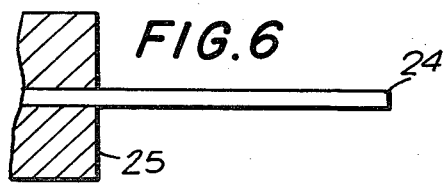
FIGS. 6 and 7 are schematic representations of a testing fixture for determining the proper furnace temperature for the present invention.
Figure 7:
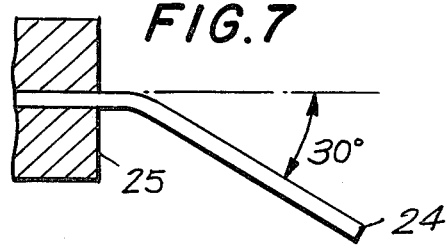

The temperature, time and pressure schedule will depend on the core glass composition, cladding glass composition, and multi-fiber cross sectional size. One skilled in the art can easily arrive at such a schedule by trial and error, but there are useful starting guide-lines. As shown in FIG. 6, if a multi-fiber 24 is cantilevered 4" beyond a support 25 in a furnace and the temperature is raised slowly until the fiber has bent about 30°, as shown in FIG. 7. That temperature is a good first approximation for the furnace temperature to be used in the stacking process.

If the piston face is massive or water cooled, the transfer time will not be too critical. The layer to be added should make contact at no more than 1/10 pound per square inch. The pressure is then doubled every 3 seconds or so for approximately 20 seconds, reaching finally about 10 pounds per square inch.

If any of the multi-fibers fail to adhere, the temperature may be increased 20° F. If the multi-fibers are imprinted by surface roughness of the piston face, the time cycle should be shortened by raising the pressure more rapidly. If multi-fibers break, raise the pressure more slowly.

To further refine the process, the temperature of the face of the piston can be measured and controlled to hold it at the annealing temperature of the core or cladding glass, whichever is higher. This allows a faster pressure build-up cycle without multi-fiber breakage.

If size control of the multi-fibers is poor, the pressure build-up will need to be slower and perhaps even the initial pressure reduced. If the multi-fibers have numerous or large surface imperfections, their breakage will be introlerable, but in that case the fused block would be of poor quality in any case.

As a general guideline, the multi-fiber should be held to 5% dimensional tolerance. The size range ordinarily used in the present art is 0.020" to 0.060" although there is no fast limit to these dimensions. In general, the process of our present invention allows using somewhat smaller multi-fibers since a single layer of 0.010" multi-fibers may be assembled without much difficulty, whereas a complete stack of 0.010" fibers would be exceedingly difficult to accomplish.

The pressure build-up time will be shorter for smaller multi-fibers and longer for larger multi-fiber.

In a specific case, Schott F-2 core glass and Owens-Illinois EN-1 cladding glass with a square multi-fiber of 0.040" thickness can be utilized. In such a case, oven temperature is 1100° F.; piston pressure starts at 1/10 pound, and is doubled every 3 seconds until 10 pounds per square inch is attained. The piston face is maintained at 800° F., and should be highly polished. No. 321 stainless steel, gold, nickel or platinum surfaces are all acceptable.

What is claimed is:

1. A method for assembling multi-fiber fiber optic devices in connection with an oven mold defining an opening and a piston surface for insertion to and withdrawal from said opening, comprising the steps of: assembling a single layer of multi-fibers upon said surface, heating the oven to a point where said layer will adhere within said mold, moving the surface into said mold, and withdrawing said surface without said layer before said layer adheres to said surface.

2. The invention according to claim 1, wherein the additional step of thereafter providing another layer of multi-fibers upon said surface and repeating the other steps is provided.

* * * * *